(12) United States Patent
Eminoglu (10) Patent No.: US 10,309,002 B2
(45) Date of Patent: Jun. 4, 2019

(54) COATING METHODS AND A TEMPLATE FOR USE WITH THE COATING METHODS

(71) Applicant: GENERAL ELECTRIC COMPANY, Schenectady, NY (US)

(72) Inventor: Cem Murat Eminoglu, Simpsonville, SC (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 987 days.

(21) Appl. No.: 14/098,068

(22) Filed: Dec. 5, 2013

(65) Prior Publication Data

US 2016/0160337 A1 Jun. 9, 2016

(51) Int. Cl.
| C23C 4/01 | (2016.01) |
| C23C 4/02 | (2006.01) |
| F01D 5/18 | (2006.01) |
| F01D 5/28 | (2006.01) |
| C23C 4/129 | (2016.01) |

(52) U.S. Cl.
CPC .......... *C23C 4/01* (2016.01); *C23C 4/02* (2013.01); *C23C 4/129* (2016.01); *F01D 5/186* (2013.01); *F01D 5/288* (2013.01); *B23P 2700/06* (2013.01); *Y02T 50/671* (2013.01); *Y02T 50/676* (2013.01); *Y02T 50/6765* (2018.05)

(58) Field of Classification Search
CPC .............. B05D 1/32; B05D 1/322; C23C 4/01
See application file for complete search history.

(56) References Cited

U.S. PATENT DOCUMENTS

| 3,196,043 A | 7/1965 | Harris et al. |
| 4,050,133 A | 9/1977 | Cretella et al. |

(Continued)

FOREIGN PATENT DOCUMENTS

| CN | 103038453 A | 4/2013 |
| CN | 103388118 A | 11/2013 |

(Continued)

OTHER PUBLICATIONS

European Search Report and Opinion issued in connection with corresponding EP Application No. 14195061.8 dated Mar. 30, 2015.

(Continued)

*Primary Examiner* — Nathan H Empie
(74) *Attorney, Agent, or Firm* — McNees Wallace & Nurick LLC (57) ABSTRACT

A method for coating a component is provided. The coating method includes providing a component having at least one aperture with an aperture geometry formed in a surface thereof, positioning a filler material within the at least one aperture, the filler material extending away from the surface of the component a distance greater than a reduced coating thickness and less than an applied coating thickness, applying at least one coating over the surface of the component and the filler material to form an applied coating having the applied coating thickness, removing a portion of the applied coating to provide the reduced coating thickness and expose the filler material, and removing the filler material to extend the at least one aperture having the aperture geometry through the applied coating. Another coating method and a template for use with the coating methods are also provided.

19 Claims, 10 Drawing Sheets

(56) References Cited

U.S. PATENT DOCUMENTS

| | | | |
|---|---|---|---|
| 4,438,804 A | | 3/1984 | Aiga et al. |
| 4,576,874 A | | 3/1986 | Spengler et al. |
| 4,743,462 A | * | 5/1988 | Radzavich ................ C23C 4/02 |
| | | | 427/282 |
| 5,039,562 A | | 8/1991 | Liang |
| 5,902,647 A | | 5/1999 | Venkataramani et al. |
| 7,192,622 B2 | | 3/2007 | Fernihough et al. |
| 8,021,719 B2 | | 9/2011 | Graichen |
| 8,211,506 B2 | | 7/2012 | Blankenship et al. |
| 2011/0305583 A1 | * | 12/2011 | Lee .......................... F01D 5/18 |
| | | | 416/97 R |
| 2013/0206739 A1 | * | 8/2013 | Reed ....................... F01D 25/12 |
| | | | 219/121.71 |
| 2013/0302522 A1 | | 11/2013 | Eminoglu et al. |

FOREIGN PATENT DOCUMENTS

| | | |
|---|---|---|
| DE | 27 22 263 A1 | 12/1977 |
| DE | 102005060712 A1 | 6/2007 |
| EP | 0 181 087 A1 | 5/1986 |
| EP | 0 185 603 B1 | 6/1986 |
| EP | 0253754 A1 | 1/1988 |
| EP | 1350860 A1 | 10/2003 |
| JP | 57117370 A * | 7/1982 |

OTHER PUBLICATIONS

Machine Translation and First Office Action and Search issued in connection with corresponding CN Application No. 201410731062.X dated Jul. 12, 2018, 25 pages.

\* cited by examiner

COATING METHODS AND A TEMPLATE FOR USE WITH THE COATING METHODS

FIELD OF THE INVENTION

The present invention is directed to coating methods and a template for use with the coating methods. More specifically, the present invention is directed to coating methods for extending apertures through a coating, and a template for selectively providing a filler material to apertures in a component.

BACKGROUND OF THE INVENTION

When turbines are used on aircraft or for power generation, they are typically run at a temperature as high as possible, for maximum operating efficiency. Since high temperatures can damage the alloys used for the components, a variety of approaches have been used to raise the operating temperature of the metal components. One approach calls for the incorporation of internal cooling channels in the component, through which cool air is forced during engine operation. The cooling holes can be formed in the substrate by specialized laser-drilling techniques. Cooling air (usually provided by the engine's compressor) is fed through the holes from the cooler side to the hot side of the combustor wall. As long as the holes remain clear, the rushing air will assist in lowering the temperature of the hot metal surface and preventing melting or other degradation of the component.

Another technique for protecting the metal parts and effectively raising the practical operating temperature of an aircraft engine involves the use of a thermal barrier coating (TBC). The TBC is usually ceramic-based. TBC systems frequently also include a bond coat which is placed between the ceramic coating and the substrate to improve adhesion. The use of TBC's in conjunction with the battery of cooling holes is sometimes the most effective means for protecting an engine part. However, incorporation of both systems can be very difficult. For example, the cooling holes sometimes cannot be formed in the engine part after a TBC has been applied, since lasers usually cannot effectively penetrate both the ceramic material and the metal to form the pattern of holes. If the cooling holes are formed prior to the application of the TBC system, they may become covered and at least partially obstructed when the bond coat and/or TBC is applied. Complete removal of the ceramic-metal material from the holes can be very time-consuming and ineffective. Any obstruction of the holes during engine operation can interfere with the passage of cooling air, can waste compressor power, and can possibly lead to engine component damage due to overheating.

Therefore methods of coating a component and method of forming cooling holes in the component that do not suffer from the above drawbacks are desirable in the art.

SUMMARY OF THE INVENTION

In one exemplary embodiment, a coating method includes providing a component having at least one aperture formed in a surface thereof, the aperture having an aperture geometry, positioning a filler material within the at least one aperture, the filler material extending away from the surface of the component a distance greater than a reduced coating thickness and less than an applied coating thickness, applying at least one coating over the surface of the component and the filler material to form an applied coating having the applied coating thickness, the applied coating adhering to the surface of the component and the filler material, removing a portion of the applied coating to provide the reduced coating thickness and expose the filler material, and removing the filler material to extend the at least one aperture having the aperture geometry through the applied coating.

In another exemplary embodiment, a coating method includes providing a component having at least one aperture formed in a surface thereof, the aperture having an aperture geometry, positioning a template over the surface of the component, the template comprising at least one template opening aligned with the at least one aperture, the at least one template opening extending the aperture geometry, positioning a filler material within the at least one template opening, the filler material extending away from the surface of the component a distance greater than a reduced coating thickness and less than an applied coating thickness, removing a removable body portion of the template without removing the filler material, applying at least one coating over the surface of the component and the filler material to form an applied coating having the applied coating thickness, the applied coating adhering to the surface of the component and the filler material, removing a portion of the applied coating to provide the reduced coating thickness and expose the filler material, and removing the filler material to provide the at least one aperture having the aperture geometry extending through the at least one coating.

In another exemplary embodiment, a template for selectively providing a filler material to an aperture includes a removable body portion, and at least one template opening formed in the removable body portion, the at least one template opening corresponding to a location and an aperture geometry of at least one aperture on a surface of a component.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided are coating methods and a template for use with the coating methods. Embodiments of the present disclosure, in comparison to coating methods not using one or more of the features disclosed herein, maintain an original shape of an aperture extended through a coating, increase coating efficiency, increase efficiency in extending apertures through a coating, increase control of airflow for coated components, decrease coating cost, decrease coating time, decreased time for cleaning apertures after coating components, or a combination thereof.

Figure 1:
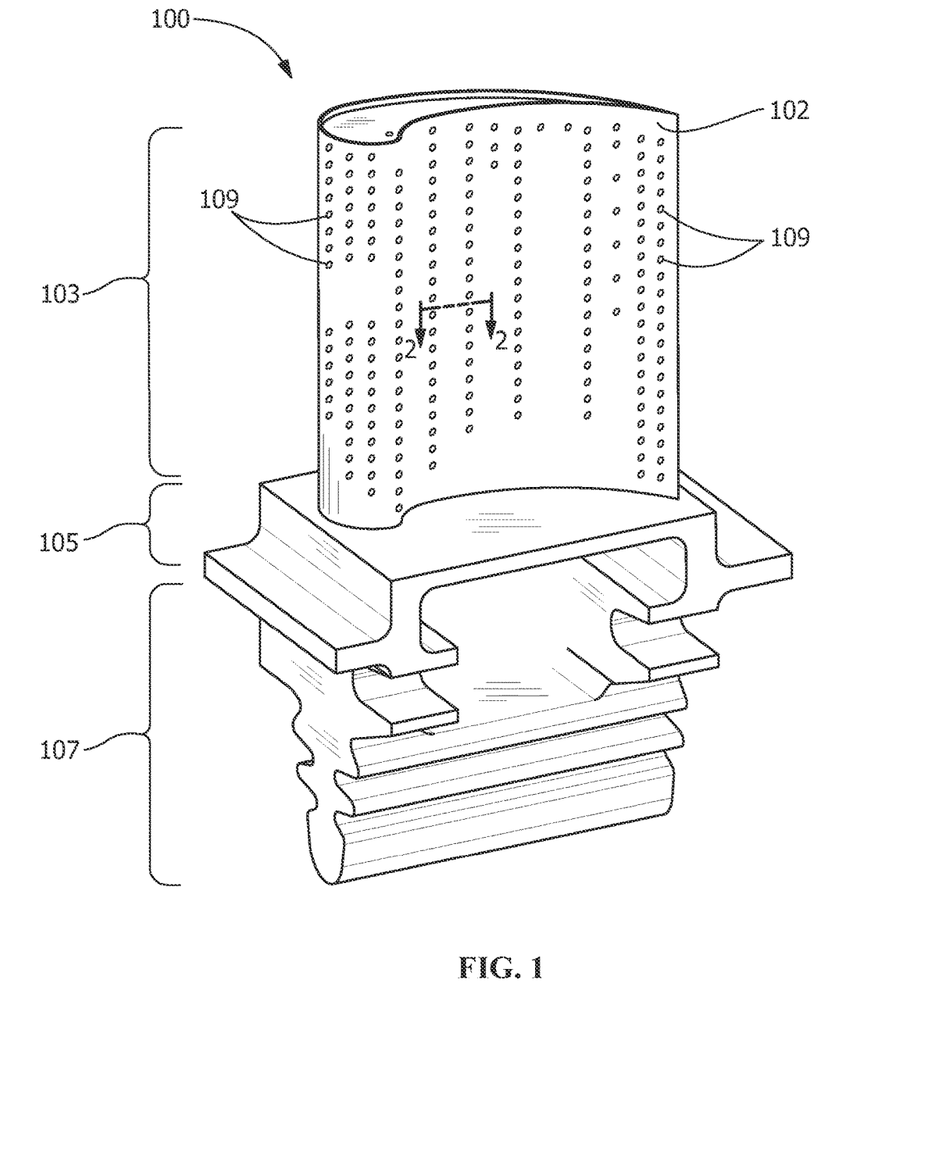
FIG. 1 is a perspective view of a blade according to an embodiment of the present disclosure.
Figure 2:
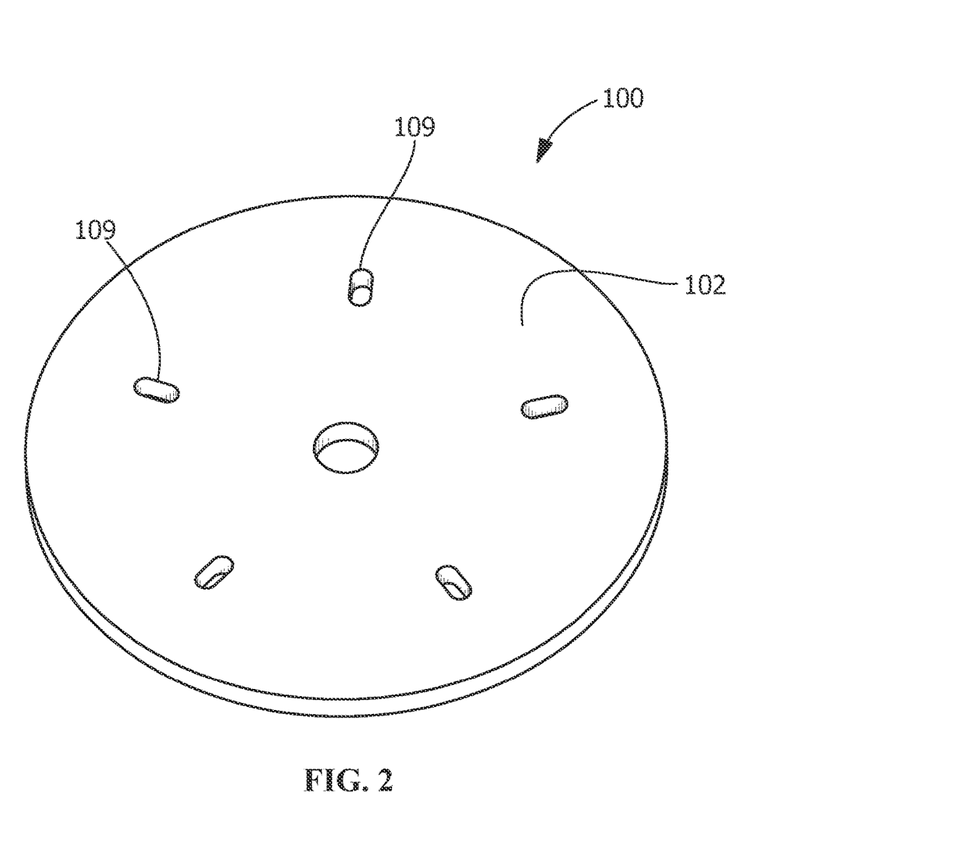
FIG. 2 is a perspective view of a nozzle according to an embodiment of the present disclosure.

Referring to FIGS. 1-2, in one embodiment, a component 100 includes any suitable component having at least one aperture 109 formed therein. In another embodiment, the component 100 includes any suitable component used in applications that undergo temperature changes, such as, but not limited to, power generation systems (e.g., gas turbines, jet turbines, and other turbine assemblies). Suitable components include, but are not limited to, a blade or a bucket (see FIG. 1), a nozzle (see FIG. 2), a vane, a shroud, a transition piece, a liner, or a combination thereof. The at least one aperture 109 includes any opening formed in an external surface 102 of the component 100, such as, but not limited to, a cooling hole (e.g., a trench cooling hole, a diffuser shape cooling hole, a straight cooling hole), an opening to provide fuel flow, or a combination thereof. For example, as shown in FIG. 1, the component 100 includes a turbine blade having an airfoil section 103, a platform section 105, and a dovetail section 107, the at least one aperture 109 being a plurality of the cooling holes formed in the external surface 102 of the airfoil section 103.

In one embodiment, the component 100 is fabricated from a high temperature oxidation and corrosion resistant alloy with high temperature strength, such as a nickel-based superalloy. In another embodiment, the component 100 includes an applied coating 400 (see FIG. 5) over the external surface 102. The applied coating 400 includes any suitable coating for covering at least a portion of the external surface 102 and/or providing protection (e.g., increased heat tolerance, increased corrosion resistance) to the external surface 102, such as, but not limited to, a bond coat, a thermal barrier coating (TBC), or a combination thereof. Suitable examples of the bond coat include, but are not limited to, MCrAlX coatings, where M is cobalt, nickel, iron, or combinations thereof, X is an active element, such as yttrium (Y) and/or silicon (Si) and/or at least one rare earth element or hafnium (Hf). Suitable examples of the TBC include, but are not limited to, ceramic coatings, such as zirconium oxide ($ZrO_2$) the crystalline structure of which may be partially or completely stabilized by adding yttrium oxide ($Y_2O_3$).

Referring to FIGS. 3-7 and 15, in one embodiment, a first coating method 140 includes providing the component 100 (step 141) having the at least one aperture 109 formed in the external surface 102 thereof, and optionally removing any old coatings or preparing the external surface of a new make component by machining, grit-blasting, sanding, etching, or combinations thereof. A filler material 111 is positioned (step 142) within the at least one aperture 109 (see FIG. 4), the filler material 111 extending away from the external surface 102 of the component 100 a distance greater than a reduced coating thickness 401 and less than an applied coating thickness 403 (see FIG. 5). A suitable distance includes, but is not limited to between about 1% and about 95% greater than the reduced coating thickness 401, between about 1% and about 90% greater than the reduced coating thickness 401, between about 1% and about 80% greater than the reduced coating thickness 401, between about 10% and about 80% greater than the reduced coating thickness 401, between about 20% and about 70% greater than the reduced coating thickness 401, between about 30% and about 60% greater than the reduced coating thickness 401, between about 40% and about 50% greater than the reduced coating thickness 401, or any combination, sub-combination, range, or sub-range thereof.

Figure 5:
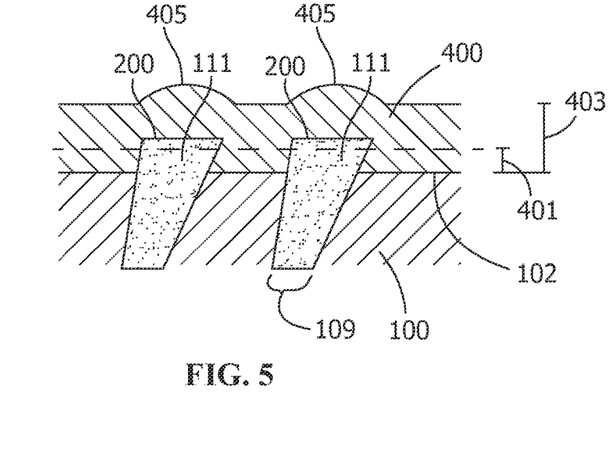
FIG. 5 is a cross-section view of an applied coating over the component and the preformed filler material according to an embodiment of the disclosure.

After positioning the filler material 111 (step 142), at least one coating is applied (step 143) over the external surface 102 of the component 100 and the filler material 111 to form the applied coating 400 having the applied coating thickness 403 (see FIG. 5). Next, a portion of the applied coating 400 is removed (step 144) to provide the reduced coating thickness 401 and expose the filler material 111 in the applied coating 400 (see FIG. 6). The filler material 111 is then removed (step 145) to extend the at least one aperture 109 through the applied coating 400 (see FIG. 7).

Figure 3:
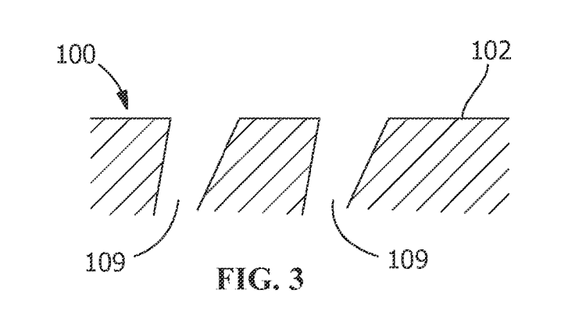
FIG. 3 is a cross-section view of the component of FIG. 1 taken in the 2-2 direction showing a plurality of apertures according to an embodiment of the disclosure.
Figure 4:
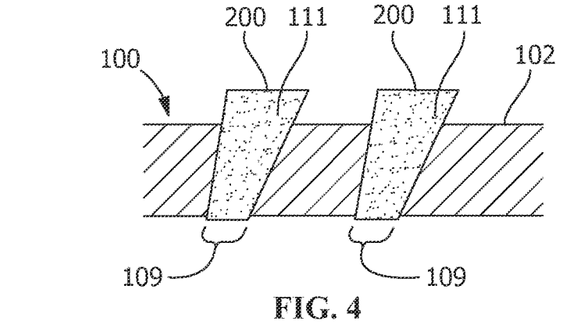
FIG. 4 is a cross-section view showing preformed filler material positioned in the plurality of apertures according to an embodiment of the disclosure.
Figure 8:
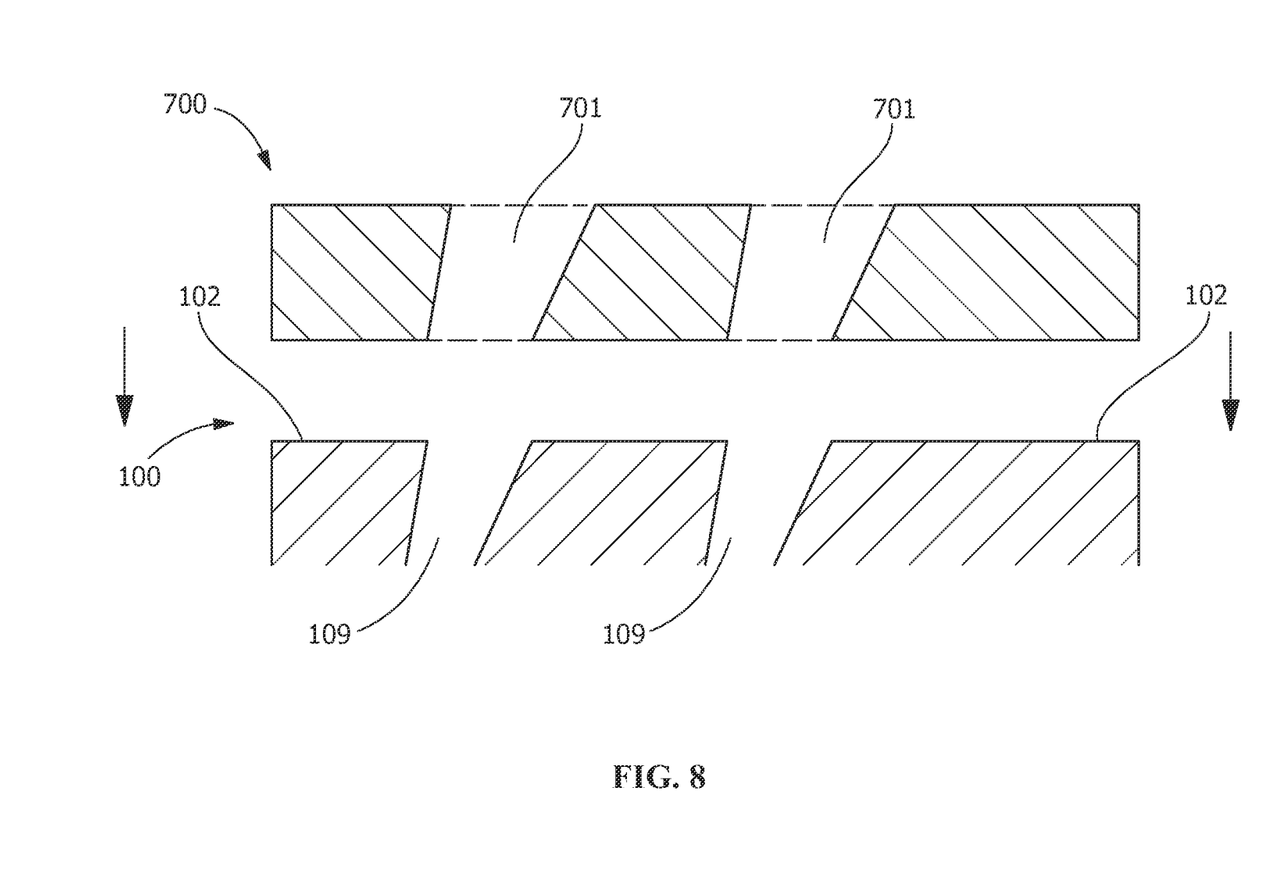
FIG. 8 is a schematic view of a template being positioned over the component.
Figure 9:
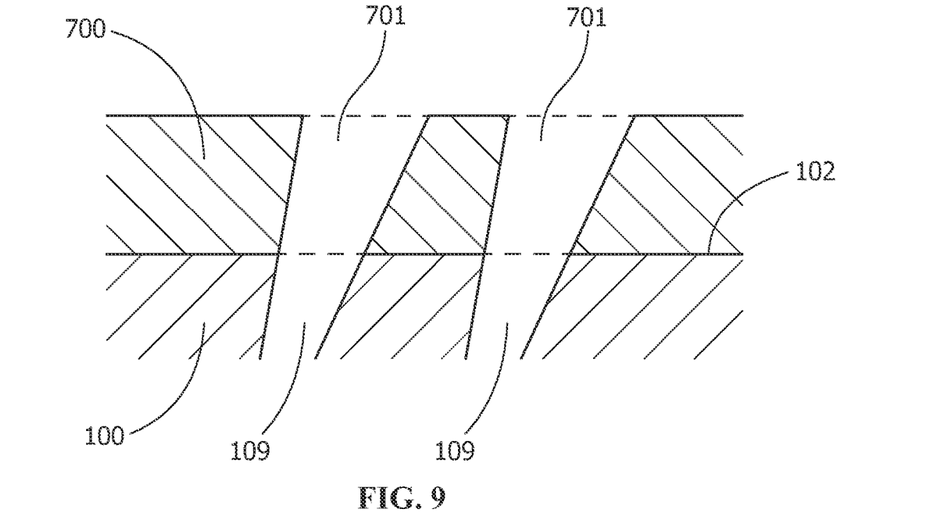
FIG. 9 is a cross-section view of template openings in the template aligned with the plurality of apertures in the component according to an embodiment of the disclosure.

Referring to FIGS. 3-4, the at least one aperture 109 includes any suitable aperture geometry based upon a function of the aperture 109 and/or a type of the component 100. Suitable aperture geometries include, but are not limited to, circular, elliptical, rectangular, square, trapezoidal, any other shape permitting flow therethrough, or a combination thereof. In one embodiment, the at least one aperture 109 varies as it extends through the component 100. For example, the at least one aperture 109 may be tapered, curved, include internal projections, or a combination thereof. In another embodiment, the filler material 111 is shaped to extend the aperture geometry of the at least one aperture 109 through the applied coating 400. For example, the filler material 111 includes, but is not limited to, a preformed filler material 200 having a shape corresponding to the aperture geometry of the at least one aperture, an extruded filler material 900 (see FIG. 10) positioned in a template 700 (see FIG. 8), or a combination thereof.

Referring to FIGS. 4-5, in one embodiment, the positioning of the filler material 111 (step 142) includes inserting the preformed filler material 200 into the at least one aperture 109. After inserting the preformed filler material 200 into the at least one aperture 109, the at least one coating is applied (step 143) over the external surface 102 of the component 100 by any suitable application method for forming the applied coating 400. Suitable application methods include, but are not limited to, air plasma spray, or electron beam physical vapor deposition. In another embodiment, the at least one coating is applied (step 143) at elevated temperatures, generally greater than about 400° C. The filler material 111 is a material resistant to the elevated temperatures present during application of the at least one coating (step 143) to seal the at least one aperture 109. The inserting of the filler material 111 reduces or eliminates filling of the at least one aperture 109 with a coating material. Depending on the temperature reached by the external surface 102 during application of the at least one coating (step 143), organics of the filler material 111 may be burned off. Examples of organics that are burned-off include carbon containing materials, and material containing sulfur that may be present in binding agents, surfactants, dispersants, wetting agents. In a further embodiment, the organics burn off between about 300° C. and about 800° C.

Figure 6:
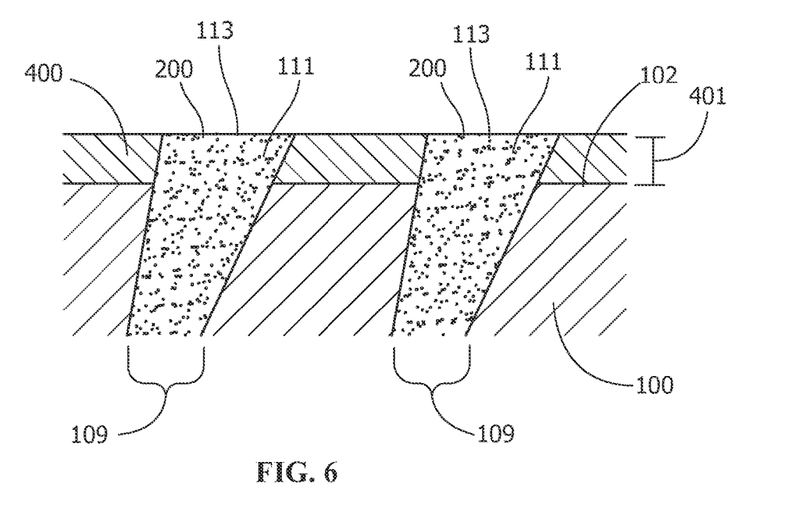
FIG. 6 is a cross-section view of the applied coating over the component after removing a portion of the applied coating according to an embodiment of the disclosure.

Referring to FIGS. 5-6, the applied coating 400 formed over the component 100 with the applied coating thickness 403 adheres to the external surface 102 and the filler material 111. In one embodiment, raised portions 405 are formed in the applied coating 400 over the filler material 111 extending away from the external surface 102. To form an exposed surface 113 of the filler material 111 and provide the reduced coating thickness 401 a portion of the applied coating 400 and/or the filler material 111 is removed (step 144) by any suitable coating removal method. Suitable methods include, but are not limited to, machining, sanding, etching, polishing, or a combination thereof. For example, in one embodiment, the applied coating 400 is polished to reduce a surface roughness of the applied coating 400 and remove any of the coating material from the exposed portion 113 of the filler material 111 having a final shape corresponding to the extended aperture geometry.

Figure 7:
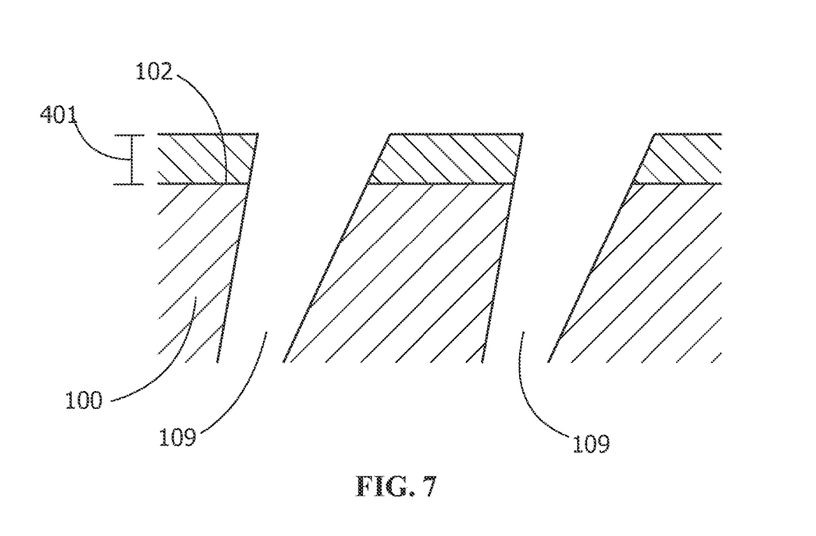
FIG. 7 is a cross-section view of the component and the applied coating after removing the preformed filler material according to an embodiment of the disclosure.

Referring to FIG. 7, after removing the portion of the applied coating 400 (step 144), the filler material 111 is removed (step 145) to extend at least a portion of the at least one aperture 109 through the applied coating 400 with the aperture geometry. The filler material 111 includes a removable material, such as, but not limited to, a soluble material, a magnetic material, a heat degradable material, or a combination thereof. In one embodiment, the removable material includes a refractory material, a binding agent, or a combination thereof. For example, in another embodiment, a paste including about 50% to 80% by weight of a refractory material, about 10% to about 40% by weight of a binding agent, and about 5%-25% by weight water or alternatively about 55% to 75% by of the refractory material, about 15% to about 35% by weight of the binding agent, and about 8%-20% by weight water, or alternatively about 60% to 70% by weight of the refractory material, about 20% to about 30% by weight of the binding agent, and about 10%-15% by weight water is dried to form the filler material 111. After drying, the filler material 111 includes only the refractory material and the binding agents.

The refractory material includes, but is not limited to, high temperature resistant filler materials, such as, but not limited to, aluminum oxide ($Al_2O_3$), zirconium oxide ($ZrO_2$), magnesium oxide (MgO), silicon dioxide ($SiO_2$), zircon ($ZrSiO_4$), tungsten carbide (WC), silicon carbide (SiC), silicon nitride, boron nitride, aluminum nitride, and graphite. The binding agent includes, but is not limited to, viscosity adjusters, and dispersants, such as, but not limited to, phosphates, silicates, sugar, high temperature salts, gum, resins, polyvinyl alcohol (PVA), polyethylene glycol, polymethyl methacrylate (PMMA), and combinations thereof. As used herein "high temperature resistant filler materials" are materials generally resistant to temperatures greater than about 205° C. (about 400° F.) or materials that are resistant to temperatures generally in the range of about 205° C. (about 400° F.) to about 982° C. (about 1800° F.). Resistant to, as used herein, refers to maintaining a shape and/or physical integrity during exposure to high temperatures.

The filler material 111 is removed (step 145) by methods including, but not limited to, breaking up, degrading, and/or dissolving the filler material 111, applying external forces (e.g., pressure, acoustics, magnets), or a combination thereof. Examples of breaking up, degrading, and/or dissolving the filler material 111 include dissolving the soluble material with a solvent, degrading the heat degradable material with heat treatment, or attracting the magnetic material with a magnet.

The solvent used to dissolve the filler material 111 is dependent upon the composition of the soluble material. Suitable solvents include, but are not limited to, water, a non-aqueous or waterless solvent, or an acidic descaler.

In one embodiment, the soluble material is a water soluble paste including about 50% to 80% by weight refractory material, about 10% to about 40% by weight binding agent, and about 5 to about 25% water before water soluble paste has dried to form the filler material 111. In another embodiment, removing the filler material 111 (step 145) formed from the water soluble paste includes immersing the filler material 111 and/or the component 100 in water until the filler material 111 is dissolved. Dissolving the filler material 111 removes the filler material 111 from the at least one aperture 109 and forms a corresponding opening in the applied coating 400. The opening extends the at least one aperture 109 and the aperture geometry through the applied coating 400 without hand drilling to clear the aperture 109 of the applied coating 400. In a further embodiment, to aid removal of the filler material 111, an external force such as mechanical (e.g. pressurized water) or acoustical vibration (e.g. ultrasonics) may be employed while the filler material 111 and/or the component 100 is immersed in the water.

In an alternate embodiment, the filler material 111 includes a non-aqueous soluble high temperature resistant filler material and/or binding agent. To remove or dissolve the filler material 111, the filler material 111 and/or the component 100 is immersed in the non-aqueous solvent. The non-aqueous solvent is selected to react with or dissolve the high temperature resistant filler material of the filler material 111. For example, the filler material 111 including alumina mixed with PMMA is immersed in an acetone solvent to dissolve the filler material 111. Other suitable examples of non-aqueous or waterless solvents, include, but are not limited to, alcohols (e.g., acetone), ammonia, weak acids, (e.g., such as citric acid), 5-10% HCl, nitric acid, sulfuric acid, perchloric acid, boric acid, or terpineol.

In another alternate embodiment, the filler material 111 includes an oxide filler. To remove the filler material 111 including an oxide filler, the acidic descaler is used. Suitable examples of acidic descalers include, but are not limited to, citric acid, hydrochloric acid, nitric acid, sulfuric acid, perchloric acid, or boric acid.

In one embodiment, the filler material 111 includes the heat degradable material, such as, but not limited to, graphite powder which may be burned off at 400° C. in air or in the presence of water. To remove the filler material 111 including the graphite powder, component 100 is heat treated at between about 350° C. to about 650° C. to degrade the filler material. In another embodiment, the removal of the filler material 111 by heat treatment may include or be replaced by high pressure air spraying, acid cleaning, ultrasonic treatment in water, or a combination thereof.

In another embodiment, the filler material 111 includes the magnetic material. For high temperature coating processes such as High Velocity Oxygen Fuel (HVOF) or Air Plasma Spray (APS), the filler material 111 includes magnetic oxide with a Curie Temperature of greater than about 600° C. that remains magnetic after the coating process. A suitable example of a magnetic oxide having a Curie Temperature of greater than 600° C. includes, but is not limited to, Iron Oxide ($Fe_2O_3$), which has a Curie Temperature of 622° C. After the portion of the applied coating 400 has been removed (step 144) to expose the exposed portion 113 of the filler material 111, a magnet is used to remove the filler material 111 including magnetic oxide. During removal, the magnet is placed adjacent to the exposed portion 113 of the filler material 111 to attract the magnetic oxide in the filler material 111 and remove the filler material 111 from the applied coating 400 and the at least one aperture 109.

Referring to FIGS. 8-14 and 16, in one embodiment, a second coating method 150 includes providing the component 100 (step 151) having the at least one aperture 109 formed in the external surface 102 thereof, the aperture 109 having the aperture geometry, and optionally removing any old coatings or preparing the external surface of a new make component by machining, grit-blasting, sanding, etching, or combinations thereof. The template 700 is positioned over the external surface 102 of the component 100 (step 152) with at least one template opening 701 in a removable body portion of the template 700 aligned with the at least one aperture 109 in the component 100 (see FIG. 8). The at least one template opening 701 aligned with the at least one aperture 109 extends the aperture geometry through the template 700 (see FIG. 9).

Figure 10:
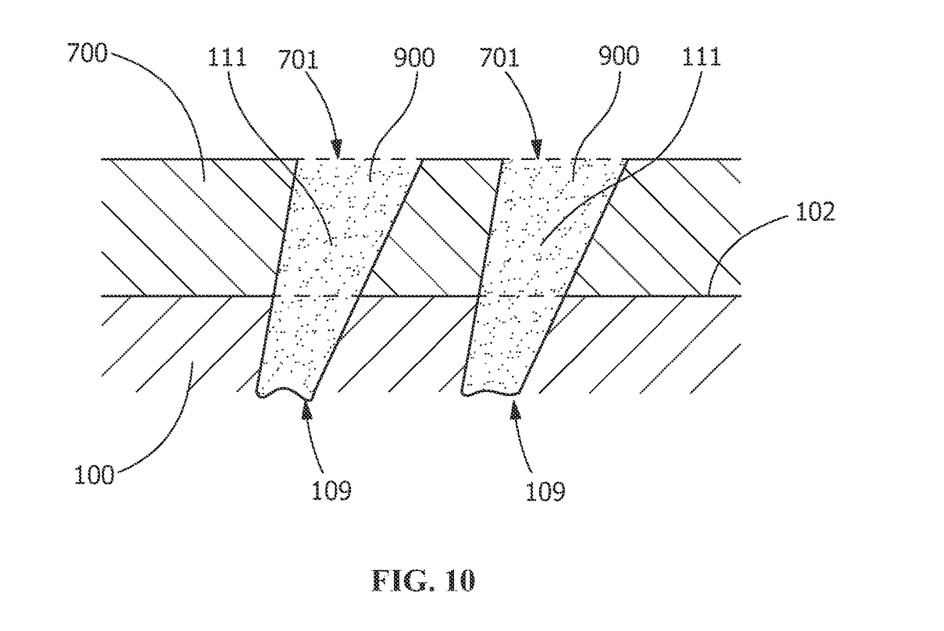
FIG. 10 is a cross-section view of a filler material positioned within the aligned template openings and the plurality of apertures.
Figure 11:
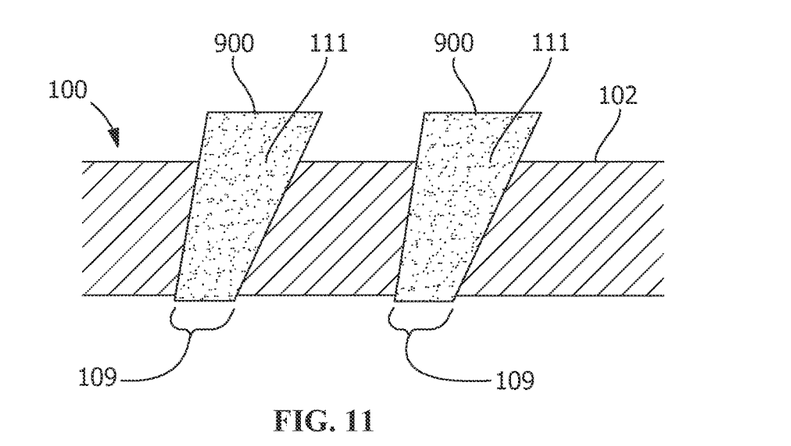
FIG. 11 is a cross-section view showing the filler material positioned in the plurality of apertures after removing the template according to an embodiment of the disclosure.
Figure 12:
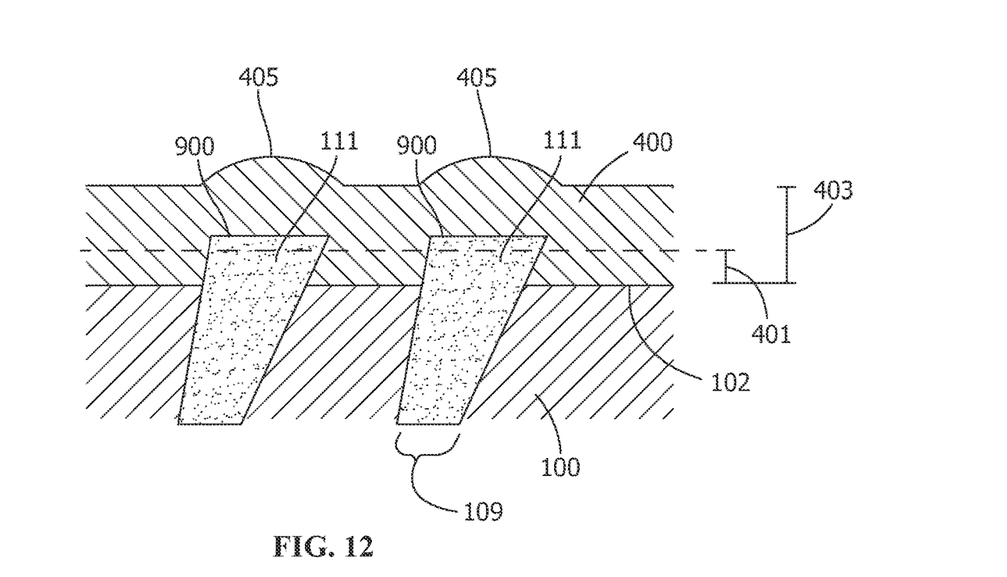
FIG. 12 is a cross-section view of an applied coating over the component and the filler material according to an embodiment of the disclosure.
Figure 13:
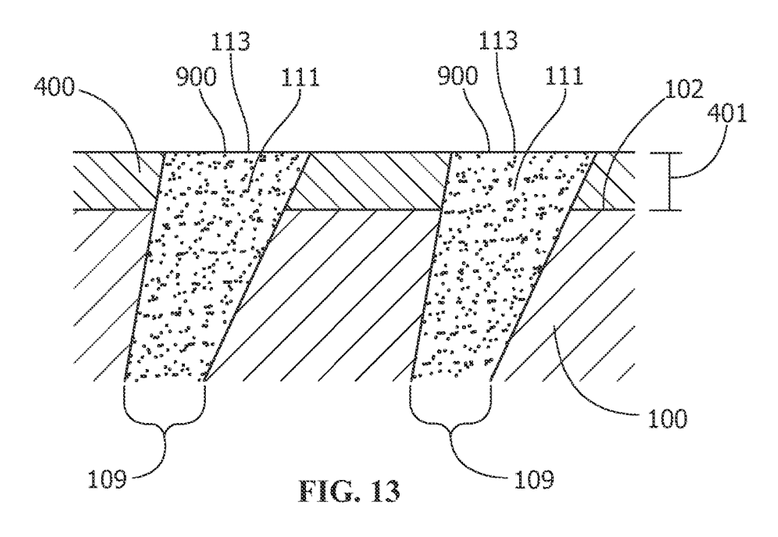
FIG. 13 is a cross-section view of the applied coating over the component after removing a portion of the applied coating according to an embodiment of the disclosure.
Figure 14:
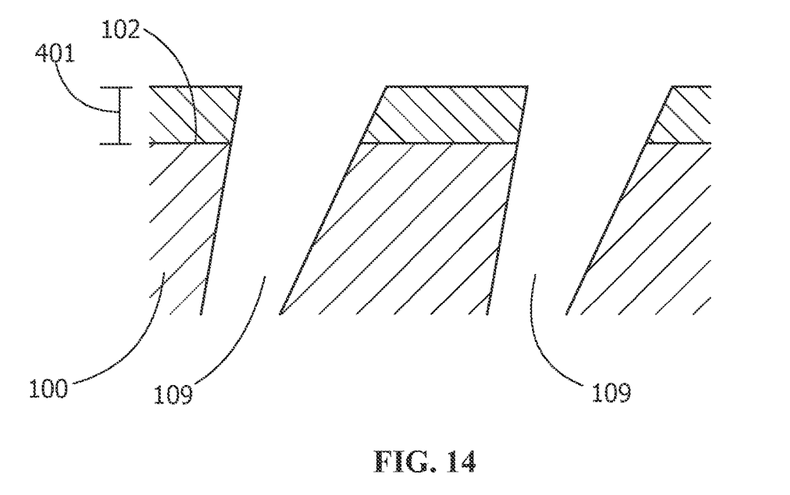
FIG. 14 is a cross-section view of the component and the applied coating after removing the filler material according to an embodiment of the disclosure.
Figure 15:
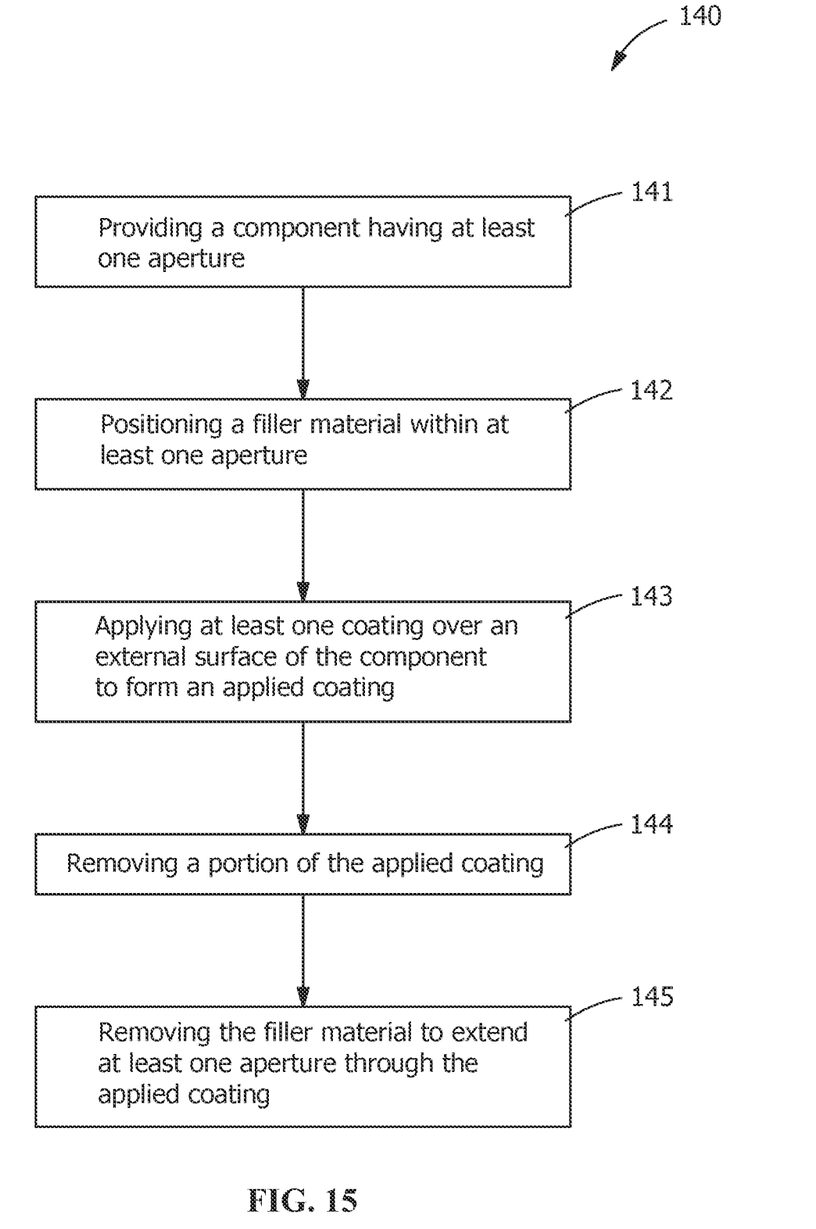
FIG. 15 is a flow chart of a coating method according to an embodiment of the disclosure.
Figure 16:
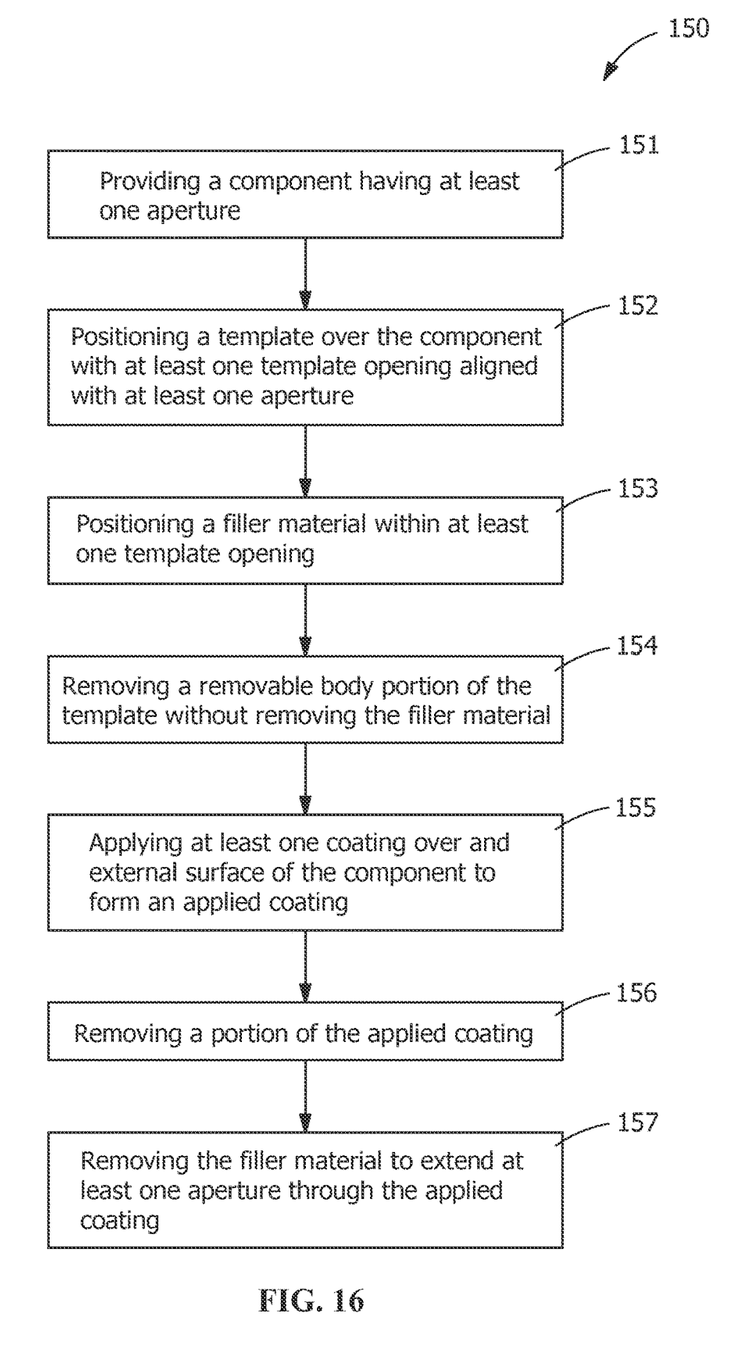
FIG. 16 is a flow chart of a coating method according to an embodiment of the disclosure.

After positioning the template 700 (step 152), the filler material 111 is positioned within the at least one template opening 701 (step 153), the filler material 111 extending away from the external surface 102 of the component 100 a distance greater than the reduced coating thickness 401 and less than the applied coating thickness 403 (see FIG. 10). The removable body portion of the template 700 is then removed (step 154) without removing the filler material 111, and the at least one coating is applied (step 155) over the external surface 102 of the component 100 and the filler material 111 to form the applied coating 400 having the applied coating thickness 403 (see FIGS. 11 and 12). In one embodiment, the applied coating 400 adheres to the external surface 102 of the component 100. In another embodiment, the applied coating 400 adheres to the external surface 102 and the filler material 111. Next, a portion of the applied coating 400 is removed (step 156) to provide the reduced coating thickness 401 and expose the filler material 111 in the applied coating 400 (see FIG. 13). The filler material 111 is then removed (step 157) to extend the at least one aperture 109 through the applied coating 400 (see FIG. 14).

The removable body portion of the template 700 includes any suitable material, such as, but not limited to, meltable material, plastic, polymer, rubber, or a combination thereof. In one embodiment, the removable body portion of the template 700 conforms to the external surface 102 of the component 100 (see FIG. 9). Conforming the removable body portion of the template 700 to the external surface 102 reduces or eliminates space between the at least one template opening 701 and the at least one aperture 109. The reduced space permits positioning of the filler material 111 within the at least one aperture 109 through the template opening 701, without deposition of the filler material 111 on the external surface 102 (see FIG. 10).

In one embodiment, the filler material 111 includes the extruded filler material 900 in an initial viscous form, such as a paste. The extruded filler material 900 in the initial viscous form is positioned within the at least one template opening 701 and/or the at least one aperture 109 by any suitable extrusion means, such as, but not limited to, manual application, a syringe, a caulking-gun, or a combination thereof. In another embodiment, the positioning of the extruded filler material 900 is automated, for example, by a computer controlled device including a plurality of extrusion devices. Depending on the viscosity of the extruded filler material 900, it may be cured using any suitable curing means, prior to application of coatings. Suitable curing means include, but are not limited to, air drying, heating, ultra-violet radiation, or chemical curing to solidify the extruded filler material 900. In a further embodiment, the curing of the extruded filler material 900 melts the removable body portion of the template 700.

After curing the extruded filler material 900 and removing the removable body portion of the template 700, the at least one coating is applied (step 155) over the external surface of the component 100. The application of the at least one coating (step 155), removal of a portion of the at least one coating (step 156), and removal of the filler material 111 (step 157) proceeds in the same manner as steps 143-145 of the first coating method 140.

The following examples are intended to further illustrate the present disclosure. They are not intended to limit the disclosure in any way.

EXAMPLES

Example 1

In one embodiment, prior to drying, a composition of the filler material 111 includes 60 g alumina flour, 25 g 30% colloidal silica binder, and 15 g water. The filler material 111 is formed into a shape corresponding to the aperture geometry, and is applied manually (e.g., inserted) into the at least one aperture 109, such as the cooling hole on the external surface 102 of a gas turbine stage 1 nozzle. A High Velocity Oxygen Fuel (HVOF) Thermal Spray process is used to apply the bond coat to the external surface 102 of the component 100, and an Air Plasma Spray (APS) process is used to apply the TBC over the bond coat to form the applied coating 400. Next, a portion of the applied coating 400 is removed to provide the reduced coating thickness 401, and then the component 100 is dipped into a bath containing warm water. The warm water dissolves the filler material 111, providing the at least one aperture 109 extending through the component 100 and the applied coating 400 with the aperture geometry. After removing the filler material 111 from the at least one aperture 109, a final heat treatment is applied to component 100 to cure the applied coating 400.

Example 2

In another embodiment, the composition of the filler material 111 includes a mixture of acetone, polymethyl methacrylate (PMMA), and alumina. To make the filler material 111, 20% by weight PMMA is dissolved in acetone, then alumina is added to maximize the solids content to form a paste. The paste is shaped manually or in a mold and dried to form the preformed filler material 200. The preformed filler material 200 is then applied to the at least one aperture 109, such as the cooling hole openings on the external surface 102 of the gas turbine stage 1 nozzle. The HVOF Thermal Spray process is used to apply the bond coat to the external surface 102 of the component 100, and the APS process is used to apply the TBC to form the applied coating 400. A portion of the applied coating 400 is removed to provide the reduced coating thickness 401, and then the component 100 is dipped into an acetone tank to dissolve the PMMA in the filler material 111. Acetone dissolves the filler material 111, providing the at least one aperture 109 extending through the component 100 and the applied coating 400 with the aperture geometry. Alternatively, ultrasonication may be used in combination with the acetone bath to remove the filler material 111 from the at least one apertures 109. After removing the filler material 111 from the at least one aperture 109, the final heat treatment is applied to component 100 to cure the applied coating 400.

Example 3

In another embodiment, the composition of the filler material 111 includes a graphite paste. The graphite paste includes fine carbon powder dispersed in a solvent (aqueous or non-aqueous), and may include special additives for adjusting viscosity, preventing adhesion to cooling holes, and preventing corrosion. The graphite paste is shaped to provide the preformed filler material 200 having the shape corresponding to the aperture geometry, and applied manually into the at least one aperture 109, such as the cooling hole openings in the external surface 102 of the gas turbine stage 1 nozzle. The HVOF Thermal Spray process is used to apply the bond coat to the external surface 102 of the component 100, and the APS process is used to apply the TBC to form the applied coating 400. A portion of the applied coating 400 is removed to provide the reduced coating thickness 401, and then the component 100 is heated in an air furnace to about 538° C. (about 1000° F.) to oxidize/burn off the filler material 111 in the at least one aperture 109. After burning-off the filler material 111, the at least one aperture 109 is air blasted to remove any remaining bits or pieces of the filler material 111 and the final heat treatment is applied to the component 100 to cure the applied coating 400.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A coating method, comprising:
providing a component having at least one aperture formed in a surface thereof, the aperture having an aperture geometry, the aperture geometry tapering, curving, or a combination thereof as the aperture extends into the component from the surface of the component; then
positioning a filler material within the at least one aperture, the filler material extending away from the surface of the component a distance greater than a reduced coating thickness and less than an applied coating thickness, the filler material being shaped to extend the tapering, curving, or combination thereof of the aperture geometry through an applied coating; then
applying at least one coating material over the surface of the component and the filler material to form the applied coating having the applied coating thickness, the applied coating adhering to the surface of the component and the filler material; then
removing a portion of the applied coating to provide the reduced coating thickness and to expose the filler material; and then
removing the filler material to expose the at least one aperture having the tapering, curving, or combination thereof of the aperture geometry extending through the applied coating.

2. The method of claim 1, further comprising providing a preformed filler material having a shape corresponding to the aperture geometry.

3. The method of claim 1, further comprising extruding the filler material through a template to form a shape corresponding to the aperture geometry.

4. The method of claim 1, wherein the distance further comprises between about 1% and about 80% greater than the reduced coating thickness.

5. The method of claim 1, further comprising selecting the filler material from the group consisting of water-soluble materials.

6. The method of claim 1, wherein removing the filler material comprises dissolving the filler material with a solvent.

7. The method of claim 1, wherein removing the filler material comprises degrading the filler material with a heat treatment.

8. The method of claim 1, wherein applying at least one coating material further comprises applying a bond coat and a thermal barrier coating.

9. The method of claim 1, further comprising selecting the component from the group consisting of a nozzle, a blade, a vane, a shroud, a bucket, a transition piece, a liner, and combinations thereof.

10. The method of claim 1, wherein the filler material is shaped by a template to extend the tapering, curving, or combination thereof of the aperture geometry through the applied coating, and the at least one aperture has the tapering, curving, or combination thereof of the aperture geometry extending through the applied coating as shaped by the template.

11. The method of claim 1, wherein the removing a portion of the applied coating to provide the reduced coating thickness and to expose the filler material further comprises removing a first portion of the filler material to expose a remaining portion of the filler material.

12. The method of claim 1, wherein the component is fabricated from a nickel-based superalloy.

13. The coating method of claim 1, further comprising:
positioning a template over the surface of the component, the template comprising at least one template opening aligned with the at least one aperture, the at least one template opening extending the aperture geometry, wherein positioning the filler material within the at least one aperture includes positioning the filler material within the at least one template opening; and
removing a removable body portion of the template without removing the filler material.

14. The method of claim 13, further comprising curing the filler material prior to removing the removable body portion of the template.

15. The method of claim 14, wherein curing the filler material comprises a curing method selected from the group consisting of heating, ultra-violet radiation, and a combination thereof.

16. The method of claim 14, further comprising melting the removable body portion of the template while curing the filler material.

17. The method of claim 13, further comprising filling at least a portion of the at least one aperture aligned with the at least one template opening.

18. The method of claim 13, further comprising conforming the removable body portion of the template to the surface of the component.

19. The method of claim 13, wherein removing the filler material further comprises a removal method selected from the group consisting of providing a solvent, providing heat, applying magnetic force, applying compressed air, and combinations thereof.

\* \* \* \* \*